Feb. 13, 1951 P. J. M. RICHARTZ 2,541,289
PHOTOGRAPHIC CAMERA INTERLOCK
Filed Aug. 19, 1948 2 Sheets-Sheet 1
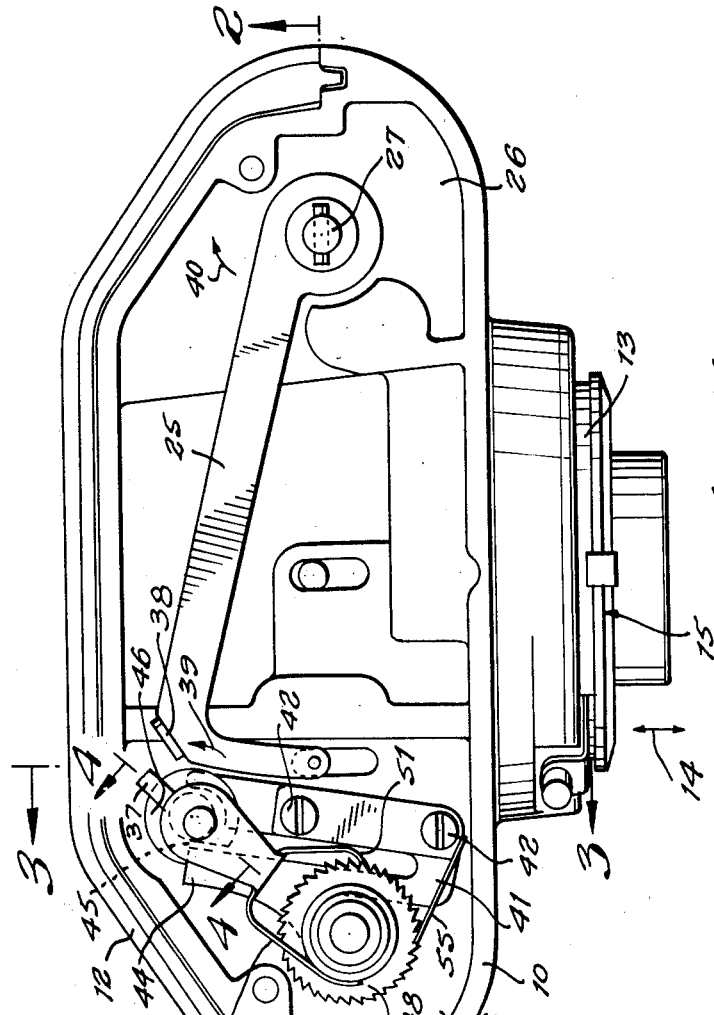
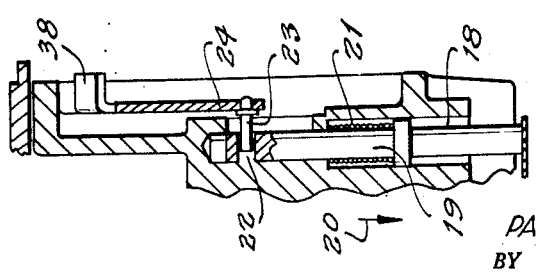
INVENTOR.
PAUL J. M. RICHARTZ
BY Feb. 13, 1951 P. J. M. RICHARTZ 2,541,289
PHOTOGRAPHIC CAMERA INTERLOCK
Filed Aug. 19, 1948 2 Sheets-Sheet 2

INVENTOR.
PAUL J. M. RICHARTZ
BY

Patented Feb. 13, 1951

2,541,289

UNITED STATES PATENT OFFICE 2,541,289

PHOTOGRAPHIC CAMERA INTERLOCK

Paul J. M. Richartz, New York, N. Y., assignor to Jacques Bolsey, New York, N. Y.

Application August 19, 1948, Serial No. 45,149

5 Claims. (Cl. 95—31)

My present invention relates to photographic cameras.

It is an object of my present invention to provide photographic cameras, particularly photographic cameras equipped with a shutter mechanism carried by a slidable lens barrel, with double exposure preventing means of an entirely new type.

It is a further object of my present invention to provide double exposure preventing means of the above type which are extremely simple in construction and easy to manufacture.

It is still a further object of my present invention to provide a new counter mechanism which is composed of a few parts only and is very reliable in operation.

Still another object of my present invention consists of film transporting means constructed so as to permit always only transportation of a film portion of predetermined length.

With the above objects in view, a photographic camera of the type proposed by me preferably includes a shutter operating lever arranged so as to be manually movable from shutter arming into shutter operating position, and tending to automatically return from the shutter operating into the shutter arming position, blocking adapted to prevent when in operative position turning of the shutter operating lever from the shutter operating position into the shutter arming position but not adapted to prevent turning of the shutter operating lever from the shutter arming position into the shutter operating position, a transporting mechanism within the photographic camera for transporting a film strip between each two consecutive exposures a predetermined length of film, and operating means actuated by the transporting mechanism during each operation of the same so as to move the blocking means out of the path of the shutter operating lever permitting the same to return into the shutter arming position.

My new double exposure preventing means are particularly adapted for use in combination with photographic cameras including a lens barrel arranged slidably in direction of the optical axis of the camera lens, and a shutter mechanism mounted on this lens barrel movably together with the same. Such arrangements usually include a shutter operating member which forms part of the shutter mechanism and is arranged so as to be movable from shutter arming into shutter operating position and to tend to automatically return from shutter operating into shutter arming position.

As set forth above, my present invention consists in arrangements for preventing the film strip to be transported more than one frame length. These means preferably consist of the combination of turnable film receiving means, a hand operated member for manually turning the turnable film receiving means arranged slidably in axial direction of the turnable film receiving means between normal and releasing position, coupling means permanently connecting the hand operated member with the turnable film receiving means, a film guiding sprocket adapted to engage and be turned by the film strip before the same is wound on the turnable film receiving means, a turnable supporting member, coupling means between the film guiding sprocket and the turnable supporting member permitting turning of the film guiding sprocket during turning by the film strip only together with said turnable supporting member, but permitting free wheeling of the guiding sprocket in opposite direction without turning of the turnable supporting member, blocking means on the turnable supporting member, a blocking spring adapted to engage the blocking means after each complete revolution of the film guiding sprocket so as to block further turning of the turnable supporting member and the film guiding sprocket, and releasing means mounted on the hand operated member for disengaging the blocking spring from the blocking means on the turnable supporting member when the hand operated member is manually moved against action of the spring means from normal into releasing position.

The new counter arrangement provided by me in accordance with my present invention preferably includes a turnable frame counter, a turnable member carrying out one revolution during transportation of the film strip by one frame, a ratchet wheel secured to the turnable frame counter coaxially with the same, a ratchet pawl eccentrically pivoted to the turnable member, spring means permanently pressing the ratchet pawl into engagement with the ratchet wheel so that the same is turned step by step during rotation of the turnable member, means preventing turning of the ratchet wheel against its direction of turning by the ratchet pawl, and means for turning the turnable member.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a top view of the camera shown in Fig. 2, with the camera cover removed, and seen in direction of arrow 1 of Fig. 2;

Figure 2:
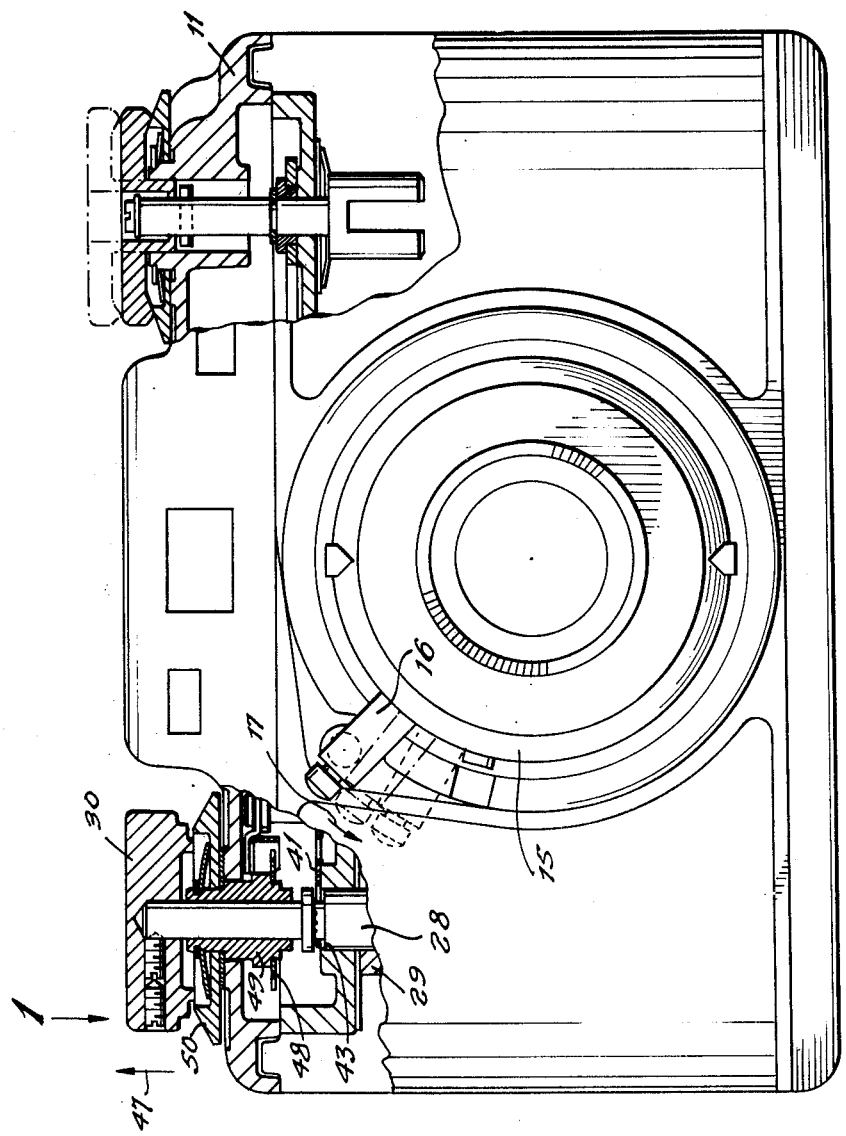
Fig. 2 is a front view of the camera shown in Fig. 1, partly in section along line 2—2.
Figure 4:
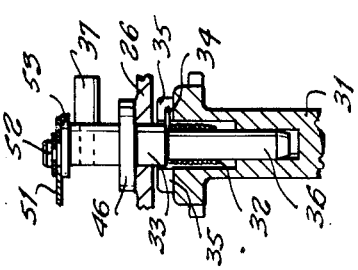

Fig. 3 is a partial vertical section through the camera shown in Figs. 1 and 2, along line 3—3 of Fig. 1; and Fig. 4 is another partial vertical section through the camera along line 4—4 of Fig. 1.

My new camera includes a camera housing 10 of conventional type, a top cover 11 usually firmly screwed to this camera housing, and a rear cover 12 which is easily removable in conventional manner in order to insert and remove the film strip.

The camera also includes a lens barrel 13 which is slidable in direction of arrow 14 and which carries the shutter mechanism 15, not shown in the drawings in detail.

The shutter operating lever 16 forms part of this shutter mechanism. It should be stressed and emphasized that this shutter mechanism is constructed in the following manner:

The shutter operating lever 16 is movable between the two end positions shown in Fig. 2, namely the upper shutter arming end position shown in full lines, and the lower shutter releasing end position shown in dotted lines. The shutter operating lever is manually movable between these two positions and passes during such movement through the intermediate position shown in dash-dotted lines.

In order to operate the shutter, the lever 16 has to be pushed downward in direction of arrow 17 from its shutter arming end position shown in full lines into the shutter releasing end position shown in dotted lines. After exposure, the lever is released and is returned by spring means of conventional type into shutter arming position.

It should be stressed that the shutter is constructed so that until the operating lever 16 has not been returned by the spring means into the uppermost shutter arming end position, the shutter operating lever is unable to operate again the shutter mechanism. Therefore, if for any reason whatever, the operating lever 16 is adapted to be lifted by the spring means only into the intermediate position shown in dash-dotted lines, pressing down of the lever will not result in an exposure.

My new double exposure preventing means includes the hole 18 provided in the body of the camera and the blocking piston 19 arranged slidably within this hole 18. This piston 19 is permanently pressed outwardly, in direction of arrow 20, by the spring 21, clearly shown in Fig. 3.

The piston 19 is provided at its rear end with a transversally extending hole 22. Into this hole projects pin 23 secured to the end 24 of the lever 25; this lever, in turn, is pivoted to the partition wall 26 within the camera housing 10 by means of pivot 27.

My new camera also includes a shaft 28 which carries a film spool 29 upon which the film strip is wound after exposure. At its top end, this shaft 28 carries the turning knob 30. It should be mentioned that shaft 28 is freely slidably mounted within the film spool 29 and connected with the same so as to be adapted to turn the film spool in any position of sliding.

The film transporting mechanism of my new camera also includes a film guiding sprocket 31, which is connected by means of spring 32 with the supporting member 33. This supporting member 33 is freely turnably journalled in the partition wall 26, as clearly shown in Fig. 4. I wish to stress that the upper end 34 of spring 32 projects into a slot 35 in the sprocket 31 and that the other part of the spring is tightly wound around the cylindrical extension 36 of the supporting member 33.

Thus, this spring 32 serves as a coupling element between the sprocket 31 and the supporting member 33, forcing the supporting member 33 to turn together with the sprocket 31 when the same is turned by the film strip while the same is wound on film spool 29 but permitting the sprocket 31 to turn in opposite direction without turning the supporting member 33. This results in turning of the supporting member 33 during winding of the film between exposures and standstill of this supporting member during rewinding of the exposed film in opposite direction.

The supporting member 33 carries near its top a pin 37 which is adapted to abut against the projection 38 provided on the lever 25.

My above described double exposure preventing mechanism operates as follows:

Assumed that the camera is in its initial position, i. e. with the shutter operating lever 16 in shutter arming end position shown in Fig. 2 in full lines; then an exposure is made by pushing down the lever 16 into the shutter releasing end position shown in dotted lines. In this position, the lever 16 is released and tends to return by spring action into its shutter arming end position.

However, in the meantime spring 21 has forced the blocking piston 19 outward in direction of arrow 20 into the path of the shutter operating lever 16, preventing the same from moving by spring action farther upward than into the intermediate position shown in dash-dotted lines. In this position, the shutter operating lever 16 is not adapted to operate the shutter, i. e. pushing down of the lever 16 from this position will not result in an exposure. In order to enable exposure, the shutter operating lever 16 has first to return into its uppermost shutter arming end position.

This is made possible only by winding of the film between consecutive exposures, namely, during such winding of the film by means of knob 30, the film will turn the sprocket 31 which, in turn, will turn the supporting member 33 and pin 37. During such turning, pin 37 will abut in direction of arrow 39 against the projection 38 of lever 25, and turn the same in direction of arrow 40, resulting in pulling of the piston 19 against direction of arrow 20. This, in turn, will result in movement of the front end of piston 19 out of the path of lever 16, permitting the same to be turned by the spring means forming part of the shutter mechanism into the upper shutter arming end position shown in full lines, ready for the next exposure.

My new camera includes also, as set forth above, means for limiting the film transport between consecutive exposures to one film frame. This purpose is attained by means of a very simple arrangement: This arrangement includes a curved leaf spring 41, secured by means of screws 42 to the partition wall 26. This leaf spring reaches, as clearly shown in Fig. 2, into the groove 43 of the slidable shaft 28. Furthermore, the free end of this leaf spring 41, namely the spring portion 44, is adapted to engage, as shown in Fig. 1, the cut-out 45 provided in the disc 46, firmly secured to the supporting member 33.

It should be stressed that the leaf spring 41 is arranged so as to tend to be permanently located in the cut-out 45, blocking turning of disc 46 and supporting member 33, but is liftable out of this cut-out, permitting turning of the disc and the supporting member.

This transportation limiting arrangement operates as follows:

If it is desired to transport the film, the knob 30 is pulled in direction of arrow 47. This will result in sliding of shaft 28 in the same direction and lifting of the spring 41 by means of groove 43 out of the cut-out in disc 46. In this position, the knob 30 is slightly turned, resulting in transportation of the film and rotation of the sprocket 31, the supporting member 33, and the disc 46.

After a slight turning the knob is released and returns into its initial axial position.

The turning is continued until the end portion 44 of spring 41 is located above the cut-out 45. At this moment, it will enter the cut-out and prevent further turning of the disc 46, the supporting member 33 and the sprocket 31. This will, of course, prevent further transportation of the film until the knob is lifted again, as set forth above.

The frame counter mentioned above includes the ratchet wheel 48 firmly secured to the sleeve 49 freely turnably supported by the upper end portion of shaft 28. This sleeve 49 carries at its upper end the counter disc 50 friction mounted in well known manner. The counter mechanism also includes the ratchet pawl 51 eccentrically pivoted by means of pivot pin 52 on the top face 53 of the supporting member 33.

Furthermore, the counter mechanism includes the spring member 54 permanently forcing the ratchet pawl 51 into engagement with the teeth of the ratchet wheel 48.

Finally, this counter arrangement also includes the leaf spring 55 arranged as shown in Fig. 1, and preventing turning of the ratchet wheel in counter-clockwise direction.

This counter mechanism operates as follows:

After each exposure, the film is wound which results in one revolution of the supporting member 33. This, in turn, results in one circular movement of the pivot 52 about the axis of turning of the supporting member 33, causing the ratchet pawl 51 to turn the ratchet wheel 48 by one tooth. This, of course, causes also turning of the counter disc 50 and proper indication of the number of exposures. In order to prevent unintentional turning of the ratchet wheel 48 in opposite direction, the leaf spring 55 engages the teeth of the ratchet wheel as shown.

It will be understood that each of the elements described above, or two or more together, may also find a useful application in other types of photographic cameras, differing from the types described above.

While I have illustrated and described the invention as embodied in photographic cameras of the type described above, I do not intend to be limited to the details shown, since various modifications and structural changes may be made without departing in any way from the spirit of my invention.

What I claim as new and desire to secure by Letters Patent is:

1. In a photographic camera a shutter operating lever arranged so as to be adapted to move from shutter arming position in which said shutter is armed into shutter operating position in which said shutter is released and to return from said shutter operating into said shutter arming position; first spring means permanently tending to turn said shutter operating lever from said shutter operating position into said shutter arming position; a blocking member arranged movably between inoperative position located outside of the path of said shutter operating lever and operative position located in the path of said shutter operating lever preventing return of the same from its shutter operating into its shutter arming position, said blocking member constructed so as to abut against said shutter operating lever and to be prevented by the same from returning from inoperative into operative position only when said shutter operating lever is in shutter arming position; second spring means permanently tending to move said blocking member from inoperative into operative position; a transporting mechanism within said photographic camera for transporting a film strip between each two consecutive exposures a predetermined length of film; and moving means actuated by said transporting mechanism during each operation of the same between each two consecutive exposures so as to move said blocking means against action of said second spring means from operative into inoperative position and to release said blocking member for its return by said spring means from inoperative into operative position.

2. In a photographic camera a shutter operating member arranged so as to be adapted to move from shutter arming position in which said shutter is armed into shutter operating position in which said shutter is released and to return from said shutter operating into said shutter arming position; first spring means permanently tending to turn said shutter operating lever from said shutter operating position into said shutter arming position; a blocking member arranged movably between inoperative position located outside of the path of said shutter operating lever and operative position located in the path of said shutter operating member, said blocking member constructed so as to abut against said shutter operating member to be prevented by the same from returning from inoperative into operative position only when said shutter operating member is in shutter arming position; second spring means permanently tending to move said blocking member from inoperative into operative position; a film transporting mechanism for transporting a film strip between each two consecutive exposures a predetermined length of film; a rotatable member forming part of the film transporting mechanism and constructed so as to carry out one revolution during each operation of said film transporting mechanism between each two consecutive exposures; and a moving member mounted on said rotatable member so as to be adapted to engage said blocking member during each revolution of said rotatable member and to move said blocking member against action of said second spring means from inoperative into operative position and to release said blocking member after having reached its inoperative position for its return by said second spring means from said inoperative into operative position.

3. In a photographic camera a lens barrel arranged movably in direction of the optical axis of the camera lens; a shutter mechanism mounted on said lens barrel movably together with the same; a shutter operating member forming part of said shutter mechanism and arranged so as to be adapted to move from shutter arming position in which said shutter is armed into shutter operating position in which said shutter is released and to return from said shutter operating into said shutter arming position; first spring means permanently tending to turn said shutter operating lever from said shutter operating position into said shutter arming position; a blocking member arranged movably between inoperative position located outside of the path of said shutter operating member and operative position located in the path of said shutter operating member irrespectively of the position of said shutter mechanism and said slidable lens barrel on which said shutter mechanism is mounted, said blocking member constructed so as to be prevented from returning from inoperative into operative position only when said shutter operating member is in shutter arming position; second spring means permanently tending to move said blocking member from inoperative into operative position; a film transporting mechanism for transporting a film strip between each two consecutive exposures a predetermined length of film; and moving means actuated by said film transporting mechanism during each operation of the same between each two consecutive exposures so as to move said blocking member against action of said second spring means from operative into inoperative position and to release said blocking member after having reached its inoperative position for its return by said second spring means from said inoperative into operative position.

4. In a photographic camera a lens barrel arranged movably in direction of the optical axis of the camera lens; a shutter mechanism mounted on said lens barrel movably together with the same; a shutter operating member forming part of said shutter mechanism and arranged so as to be adapted to move from shutter arming position in which said shutter is armed into shutter operating position in which said shutter is released and to return from said shutter operating into said shutter arming position; first spring means permanently tending to turn said shutter operating lever from said shutter operating position into said shutter arming position; a blocking member arranged movably between inoperative position located outside of the path of said shutter operating member and operative position located in the path of said shutter operating member irrespectively of the position of said shutter mechanism and said slidable lens barrel on which said shutter mechanism is mounted, said blocking member constructed so as to be prevented from returning from inoperative into operative position only when said shutter operating member is in shutter arming position; second spring means permanently tending to move said blocking member from said operative into inoperative position; a rotatable member within said photographic camera constructed so as to carry out one revolution each time the camera is wound between two consecutive exposures; and a moving member actuated by said rotatable member so as to be adapted to engage said blocking member during each revolution of said rotatable member and to move said blocking member against action of said second spring means from inoperative into operative position and to release said blocking member after having reached its inoperative position for its return by said second spring means from said inoperative into operative position.

5. In a photographic camera a lens barrel arranged movably in direction of the optical axis of the camera lens; a shutter mechanism mounted on said lens barrel movably together with the same; a shutter operating member forming part of said shutter mechanism and arranged so as to be adapted to move from shutter arming position in which said shutter is armed into shutter operating position in which said shutter is released and to return from said shutter operating into said shutter arming position; first spring means permanently tending to turn said shutter operating lever from said shutter operating position into said shutter arming position; a blocking member arranged movably between inoperative position located outside of the path of said shutter operating member and operative position located in the path of said shutter operating member irrespectively of the position of said shutter mechanism and said slidable lens barrel on which said shutter mechanism is mounted, said blocking member constructed so as to be prevented from returning from inoperative into operative position only when said shutter operating member is in shutter arming position; second spring means permanently tending to move said blocking member from inoperative into operative positions; a film transporting mechanism for transporting a film strip between each two consecutive exposures a predetermined length of film; a film guiding sprocket forming part of the film transporting mechanism and constructed so as to carry out one revolution during each operation of said film transporting mechanism between each two consecutive exposures; and an operating member mounted on said film guiding sprocket so as to be adapted to engage said blocking member during each revolution of said film guiding sprocket and to move said blocking member against action of said second spring means from inoperative into operative position and to release said blocking member after having reached its inoperative position for its return by said second spring means from said inoperative into operative position.

PAUL J. M. RICHARTZ.

REFERENCES CITED

The following references are of record in the file of this patent:

UNITED STATES PATENTS

| Number | Name | Date |
|---|---|---|
| 464,904 | Talley | Dec. 8, 1891 |
| 492,734 | Meredith, Jr. | Feb. 28, 1893 |
| 1,642,818 | Lessler et al. | Sept. 20, 1927 |
| 2,150,696 | Nelson | Mar. 14, 1939 |
| 2,168,974 | Christie | Aug. 8, 1939 |
| 2,168,998 | Lindenberg | Aug. 8, 1939 |
| 2,241,122 | Drotning | May 6, 1941 |
| 2,367,504 | Hutchison | Jan. 16, 1945 |
| 2,398,412 | Crumrine | Apr. 16, 1946 |
| 2,406,366 | Graef | Aug. 27, 1946 |

FOREIGN PATENTS

| Number | Country | Date |
|---|---|---|
| 687,493 | Germany | Jan. 31, 1940 |